United States Patent
Wu et al.

(10) Patent No.: US 12,230,273 B2
(45) Date of Patent: Feb. 18, 2025

(54) VOICE CONTROL METHOD AND APPARATUS FOR DEVICE, STORAGE MEDIUM, AND ELECTRONIC APPARATUS

(71) Applicant: DREAME INNOVATION TECHNOLOGY (SUZHOU) CO., LTD., Suzhou (CN)

(72) Inventors: Yadong Wu, Suzhou (CN); Haining Cai, Suzhou (CN)

(73) Assignee: DREAME INNOVATION TECHNOLOGY (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 18/676,540

(22) Filed: May 29, 2024

(65) Prior Publication Data

US 2024/0312462 A1    Sep. 19, 2024

Related U.S. Application Data

(63) Continuation of application No. PCT/CN2023/074102, filed on Feb. 1, 2023.

(30) Foreign Application Priority Data

Mar. 14, 2022    (CN) .......................... 202210248231.9

(51) Int. Cl.
    G10L 15/22    (2006.01)
    G10L 15/02    (2006.01)
(52) U.S. Cl.
    CPC .............. *G10L 15/22* (2013.01); *G10L 15/02* (2013.01); *G10L 2015/223* (2013.01)

(58) Field of Classification Search
    None
    See application file for complete search history.

(56) References Cited

U.S. PATENT DOCUMENTS

2004/0034533 A1*  2/2004  Park .................. G10L 15/20
                                                704/275
2013/0073293 A1*  3/2013  Jang .................. G10L 15/22
                                                704/E21.001

(Continued)

FOREIGN PATENT DOCUMENTS

CN    112652304 A    4/2021
CN    112953798 A    6/2021

(Continued)

*Primary Examiner* — Jonathan C Kim

(57) ABSTRACT

A voice control method and apparatus for a device, a storage medium, and an electronic apparatus are provided. The method includes: acquiring a first voice feature of first voice data collected by a cleaning device, where the first voice data correspond to a first wake-up instruction sent by a use object, and the first wake-up instruction is used to wake up at least one of the cleaning device and a base station; acquiring a second voice feature of second voice data collected by the base station, where the second voice data correspond to the first wake-up instruction; and selecting a first device to be woken up from the cleaning device and the base station according to the first and second voice features, and waking up the first device, where the first device in a wake-up state is configured to respond to a voice instruction sent by the use object.

13 Claims, 6 Drawing Sheets

(56) References Cited

U.S. PATENT DOCUMENTS

| | | | | |
|---|---|---|---|---|
| 2016/0155443 A1* | 6/2016 | Khan | ............ | G06F 3/167 |
| | | | | 704/275 |
| 2017/0004828 A1* | 1/2017 | Lee | ............ | G06F 3/167 |
| 2017/0083285 A1* | 3/2017 | Meyers | ............ | G10L 15/222 |
| 2017/0361468 A1* | 12/2017 | Cheuvront | ............ | G06F 3/16 |
| 2019/0311720 A1* | 10/2019 | Pasko | ............ | G06F 3/167 |
| 2019/0385604 A1* | 12/2019 | Foerster | ............ | G10L 15/02 |
| 2020/0043490 A1* | 2/2020 | Park | ............ | G06F 3/167 |
| 2020/0326699 A1* | 10/2020 | Bastian, II | ............ | G05D 1/2285 |
| 2021/0249016 A1* | 8/2021 | Foerster | ............ | G10L 15/02 |
| 2021/0366506 A1* | 11/2021 | Han | ............ | H04W 4/80 |
| 2022/0240743 A1* | 8/2022 | Jo | ............ | A47L 9/2873 |
| 2022/0392481 A1* | 12/2022 | Chen | ............ | G10L 25/51 |
| 2023/0136611 A1* | 5/2023 | Jeon | ............ | G06N 20/00 |
| | | | | 704/251 |

FOREIGN PATENT DOCUMENTS

| | | | |
|---|---|---|---|
| CN | 113593544 A | 11/2021 | |
| JP | 2021099534 A | 7/2021 | |

\* cited by examiner

VOICE CONTROL METHOD AND APPARATUS FOR DEVICE, STORAGE MEDIUM, AND ELECTRONIC APPARATUS

CROSS-REFERENCE TO THE RELATED APPLICATIONS

This application is a Continuation Application of International Application No. PCT/CN2023/074102, filed on Feb. 1, 2023, which is based upon and claims priority to Chinese patent application No. 202210248231.9, filed on Mar. 14, 2022, the entire contents of which are incorporated herein by reference.

TECHNICAL FIELD

The present disclosure relates to the field of smart home, and in particular to, a voice control method and apparatus for a device, a storage medium, and an electronic apparatus.

BACKGROUND

Currently, when voice is used to control the running of a cleaning device, the cleaning device is generally controlled by voice, and then the cleaning device is controlled to execute corresponding device operations according to the indication of voice control instructions. However, due to the influence of the environment and the like (for example, a voice module is blocked, environmental noise is too loud, etc.), the voice module of the cleaning device may not be able to pick up sounds, resulting in voice control failure.

Thus, it can be seen that there is a problem of low sensitivity in device voice control due to the inability to accurately pick up voice control instructions in voice control methods for a device in the related art.

SUMMARY

The objective of the present disclosure is to provide a voice control method and apparatus for a device, a storage medium, and an electronic apparatus, in order to at least solve the problem of low sensitivity in device voice control due to the inability to accurately pick up voice control instructions in the voice control methods for the device in the related art.

The objective of the present disclosure is achieved through the following technical solutions:

According to one aspect of an embodiment of the present disclosure, a voice control method for a device is provided, including: acquiring a first voice feature of first voice data collected by a cleaning device, where the first voice data are voice data corresponding to a first wake-up instruction sent by a use object, and the first wake-up instruction is used to wake up at least one of the cleaning device and a base station; acquiring a second voice feature of second voice data collected by the base station, where the second voice data are voice data corresponding to the first wake-up instruction; and selecting a first device to be woken up from the cleaning device and the base station according to the first voice feature and the second voice feature, and waking up the first device, where the first device in a wake-up state is used to respond to a voice instruction sent by the use object.

According to another aspect of an embodiment of the present disclosure, a voice control apparatus for a device is further provided, including: a first acquisition unit configured to acquire a first voice feature of first voice data collected by a cleaning device, where the first voice data are voice data corresponding to a first wake-up instruction sent by a use object, and the first wake-up instruction is used to wake up at least one of the cleaning device and a base station; a second acquisition unit configured to acquire a second voice feature of second voice data collected by the base station, where the second voice data are voice data corresponding to the first wake-up instruction; and a first wake-up unit configured to select a first device to be woken up from the cleaning device and the base station according to the first voice feature and the second voice feature, and wake up the first device, where the first device in a wake-up state is configured to respond to a voice instruction sent by the use object.

In an exemplary embodiment, the first acquisition unit includes: a first collection module configured to perform voice collection through a voice collection part of the cleaning device to obtain the first voice data; and a first extraction module configured to perform voice feature extraction on the first voice data to obtain the first voice feature in a case that the first wake-up instruction is recognized from the first voice data.

In an exemplary embodiment, the second acquisition unit includes: a first receiving module configured to receive the second voice data that match the first voice data from the base station; and a first extraction module configured to perform voice feature extraction on the second voice data to obtain the second voice feature; or a second receiving module configured to receive the second voice feature that matches the first voice feature from the base station, where the second voice feature is obtained by performing voice feature extraction on the second voice data.

In an exemplary embodiment, the apparatus further includes: a first collection unit configured to perform voice collection through a voice collection part of the cleaning device after waking up the first device to obtain third voice data; a first recognition unit configured to recognize a second wake-up instruction from the third voice data, where the second wake-up instruction is used to wake up at least one of the cleaning device and the base station; and a second wake-up unit configured to wake up the cleaning device in a case that no voice data matching the third voice data are received from the base station within a first time period, or no voice feature matching a voice feature of the third voice data is received from the base station within the first time period.

In an exemplary embodiment, the apparatus further includes: a first receiving unit configured to receive fourth voice data from the base station after waking up the first device; a first search unit configured to search for voice data that match the fourth voice data collected by the cleaning device in a case that a third wake-up instruction is recognized from the fourth voice data, where the third wake-up instruction is used to wake up at least one of the cleaning device and the base station; and a first sending unit configured to send first indication information to the base station in a case that no voice data matching the fourth voice data collected by the cleaning device are found, where the first indication information is used to indicate determining to wake up the base station; or a second receiving unit configured to receive a third voice feature from the base station, where the third voice feature is obtained by performing voice feature extraction on fifth voice data collected by the base station in a case that a fourth wake-up instruction is recognized from the fifth voice data, and the fourth wake-up instruction is used to wake up at least one of the cleaning device and the base station; a second search unit configured to search for a voice feature that matches the third voice feature in voice features of voice data collected by the cleaning device; and a second sending unit configured to send second indication information to the base station in a case that no voice feature matching the third voice feature is found, where the second indication information is used to indicate determining to wake up the base station.

In an exemplary embodiment, the second acquisition unit includes: a second collection module configured to perform voice collection through a voice collection part of the base station to obtain the second voice data; and a second extraction module configured to perform voice feature extraction on the second voice data to obtain the second voice feature in a case that the first wake-up instruction is recognized from the second voice data.

In an exemplary embodiment, the first acquisition unit includes: a third receiving module configured to receive the first voice data that match the second voice data from the cleaning device; and a third extraction module configured to perform voice feature extraction on the first voice data to obtain the first voice feature; or a fourth receiving module configured to receive the first voice feature that matches the second voice feature from the cleaning device, where the first voice feature is obtained by performing voice feature extraction on the first voice data.

In an exemplary embodiment, the apparatus further includes: a second collection unit configured to perform voice collection through a voice collection part of the base station to obtain sixth voice data after waking up the first device; a second recognition unit configured to recognize a fifth wake-up instruction from the sixth voice data, where the fifth wake-up instruction is used to wake up at least one of the cleaning device and the base station; a third wake-up unit configured to wake up the base station in a case that no voice data matching the sixth voice data are received from the cleaning device within a second time period, or no voice feature matching a voice feature of the sixth voice data is received from the cleaning device within the second time period.

In an exemplary embodiment, the apparatus further includes: a third receiving unit configured to receive seventh voice data from the cleaning device after waking up the first device; a third search unit configured to search for voice data that match the seventh voice data collected by the base station in a case that a sixth wake-up instruction is recognized from the seventh voice data, where the sixth wake-up instruction is used to wake up at least one of the cleaning device and the base station; and a third sending unit configured to send third indication information to the cleaning device in a case that no voice data matching the seventh voice data collected by the base station are found, where the third indication information is used to indicate determining to wake up the cleaning device; or a fourth receiving unit configured to receive a fourth voice feature from the cleaning device, where the fourth voice feature is obtained by performing voice feature extraction on eighth voice data collected by the cleaning device in a case that a seventh wake-up instruction is recognized from the eighth voice data, and the seventh wake-up instruction is used to wake up at least one of the cleaning device and the base station; a fourth search unit configured to search for a voice feature that matches the fourth voice feature in voice features of voice data collected by the base station; and a fourth sending unit configured to send fourth indication information to the cleaning device in a case that no voice feature matching the fourth voice feature is found, where the fourth indication information is used to indicate determining to wake up the cleaning device.

In an exemplary embodiment, the first voice feature includes a first voice intensity of the first voice data, and the second voice feature includes a second voice intensity of the second voice data; and the first wake-up unit includes: a first determination module configured to determine the cleaning device as the first device to be woken up in a case that the first voice intensity is greater than the second voice intensity, and a difference between the first voice intensity and the second voice intensity is greater than or equal to a target intensity threshold; a second determination module configured to determine the base station as the first device to be woken up in a case that the first voice intensity is less than the second voice intensity, and the difference between the first voice intensity and the second voice intensity is greater than or equal to the target intensity threshold; and a third determination module configured to determine a preset device in the cleaning device and the base station as the first device to be woken up in a case that the difference between the first voice intensity and the second voice intensity is less than the target intensity threshold.

In an exemplary embodiment, the second wake-up unit includes: a sending module configured to send fifth indication information to the first device, where the fifth indication information is used to indicate determining to wake up the first device.

In an exemplary embodiment, the apparatus further includes: a fifth receiving unit configured to receive ninth voice data sent by the first device after waking up the first device, where the ninth voice data are voice data collected by the first device in the wake-up state; a determination unit configured to determine a second device controlled by a target voice instruction sent by the use object in the cleaning device and the base station in a case that the target voice instruction is recognized from the ninth voice data; and a control unit configured to control the second device to execute a target device operation corresponding to the target voice instruction.

According to still another aspect of an embodiment of the present disclosure, a computer-readable storage medium is further provided, where a computer program is stored in the computer-readable storage medium, where the computer program is configured to execute the above voice control methods for the device when running.

According to still another aspect of an embodiment of the present disclosure, an electronic apparatus is further provided, including a memory, a processor, and a computer program that is stored in the memory and can run on the processor, where the above processor executes the above voice control methods for the device through the computer program.

In an embodiment of the present disclosure, the manner that voice features corresponding to voice data collected by the cleaning device and the base station are acquired respectively and thus a device to be woken up from the cleaning device and the base station is determined based on the obtained voice features is adopted. A first voice feature of first voice data collected by the cleaning device is obtained, where the first voice data are voice data corresponding to a first wake-up instruction sent by the use object, and the first wake-up instruction is used to wake up at least one of the cleaning device and the base station; a second voice feature of second voice data collected by the base station is obtained, where the second voice data are voice data corresponding to the first wake-up instruction; and a first device to be woken up is selected from the cleaning device and the base station according to the first voice feature and the second voice feature, and the first device is woken up, where the first device in a wake-up state is configured to respond to a voice instruction sent by the use object. Voice modules respectively provided on the cleaning device and the base station pick up sounds, and when both devices collect voice data for the same wake-up instruction, the most suitable device (for example, a device with a better pickup effect) is selected for waking up based on the voice feature, which can achieve the objective of accurately picking up the control instructions, and realize the technical effect of improving the sensitivity in device voice control, thereby solving the problem of low sensitivity in device voice control due to the inability to accurately pick up voice control instructions in the voice control methods for the device in the related art.

BRIEF DESCRIPTION OF THE DRAWINGS

The accompanying drawings herein, which are incorporated in the description and constitute part of the description, illustrate embodiments that are in accordance with the present disclosure, and are used together with the description to explain the principle of the present disclosure.

To describe the technical solutions in the embodiments of the present disclosure or in the prior art more clearly, the following briefly describes the accompanying drawings required for describing the embodiments or the prior art. Apparently, a person of ordinary skill in the art may still derive other drawings from these accompanying drawings without creative efforts.

DETAILED DESCRIPTION OF THE EMBODIMENTS

The following describes the present disclosure in detail with reference to the accompanying drawings and embodiments. It should be noted that, in the absence of a conflict, the embodiments and features in the embodiments in the present disclosure may be combined with each other.

It should be noted that the terms "first", "second", and the like in the description, claims and the above accompanying drawings of the present disclosure are used to distinguish similar objects and are not necessarily used to describe a specific order or sequence.

Figure 1:
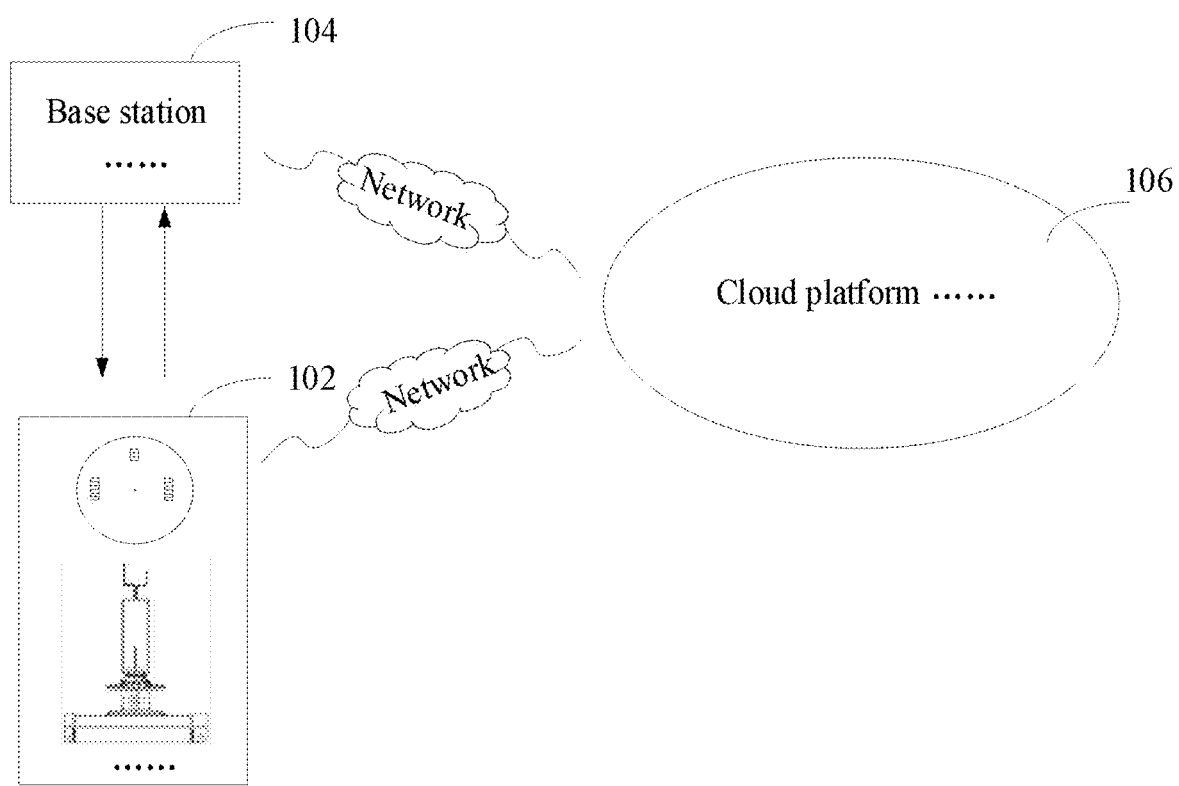
FIG. 1 is a schematic diagram of an optional hardware environment of a voice control method for a device according to an embodiment of the present disclosure.

According to one aspect of an embodiment of the present disclosure, a voice control method for a device is provided. Optionally, in the embodiment, the above voice control method for the device may be applied to a hardware environment composed of a cleaning device 102, a base station 104, and a cloud platform 106 as shown in FIG. 1. As shown in FIG. 1, the cleaning device 102 may be connected to the base station 104 and/or the cloud platform 106 (for example, voice cloud platform) through a network to achieve interaction between the cleaning device 102 and the base station 104 and/or the cloud platform 106.

The above network may include, but is not limited to, at least one of the following: a wired network, and a wireless network. The above wired network may include, but is not limited to, at least one of the following: a wide area network, a metropolitan area network, and a local area network, and the above wireless network may include, but is not limited to, at least one of the following: WIFI (Wireless Fidelity), Bluetooth, and infrared. The network used for communication between the cleaning device 102 and the base station 104 and/or the cloud platform 106 may be the same as or different from the network used for communication between the base station 104 and the cloud platform 106. The cleaning device 102 may include, but is not limited to, a sweeper, a floor scrubber, etc.

The voice control method for the device in the embodiment of the present disclosure may be executed separately by the cleaning device 102, the base station 104, or the cloud platform 106, or jointly executed by at least two of the cleaning device 102, the base station 104, and the cloud platform 106. The voice control method for the device according to the embodiment of the present disclosure executed by the cleaning device 102 or the base station 104 may also be executed by a client installed thereon.

Figure 2:
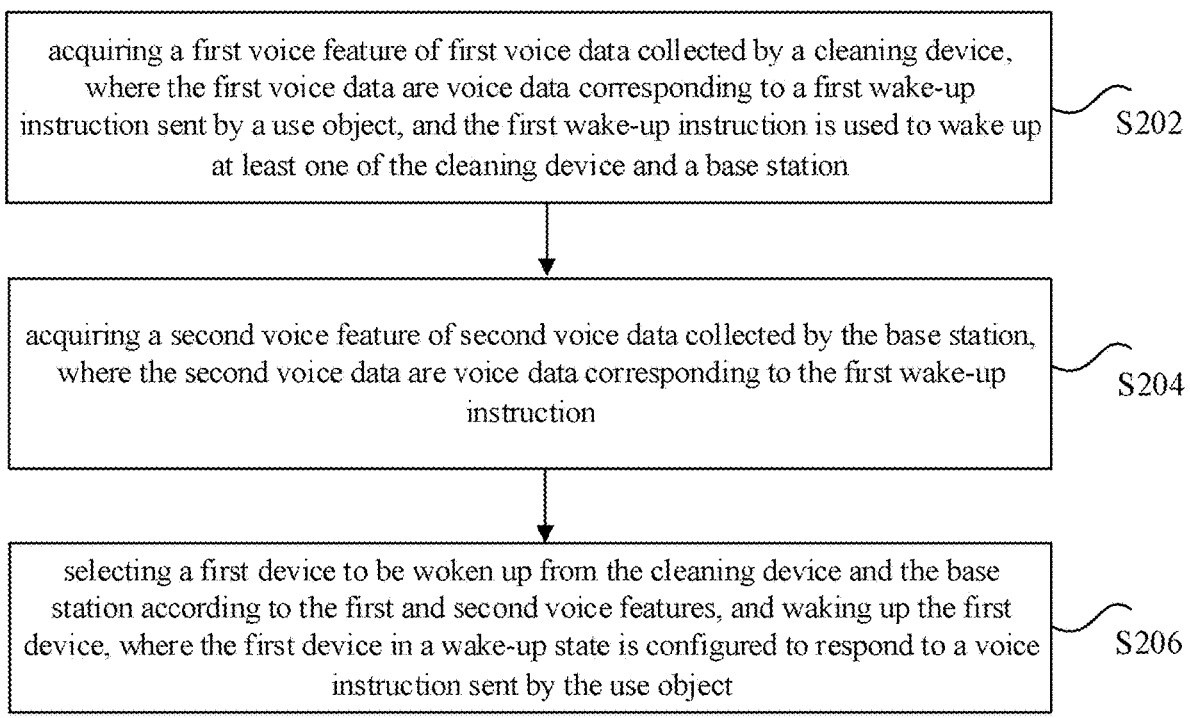
FIG. 2 is a flow diagram of an optional voice control method for a device according to an embodiment of the present disclosure.

Taking the voice control method for the device in the embodiment executed by the cleaning device 102 as an example, FIG. 2 is a flow diagram of an optional voice control method for a device according to an embodiment of the present disclosure. As shown in FIG. 2, and the process of the method may include the following steps:

Step S202, acquiring a first voice feature of first voice data collected by the cleaning device, where the first voice data are voice data corresponding to a first wake-up instruction sent by a use object, and the first wake-up instruction is used to wake up at least one of the cleaning device and the base station.

The voice control method for the device in the embodiment may be applied to the scenario of waking up the cleaning device and the base station matched with the cleaning device through voice control to perform the voice control of the device. The above cleaning device may be a sweeping robot, a floor scrubbing robot, or other devices with cleaning functions. After the use object (corresponding to a user of the cleaning device) wakes up one of the cleaning device and the base station through voice, control instructions of the use object may be collected by the device that has been woken up to control one of the cleaning device and the base station to execute corresponding device operations. The above device operations may be querying the current running state, switching the current running mode, etc., which are not limited here.

Taking the cleaning device as a sweeping robot as an example, a base station may be added in the sweeping robot to achieve self-cleaning of the sweeping robot and reduce manual maintenance of the sweeping robot. The interaction needs between the user and the base station, as well as between the user and the sweeping robot, are gradually becoming prominent. Voice control technology may enable the sweeping robot to receive voice instructions input by the user through a voice recognition system. The sweeping robot may execute operations indicated by the voice instructions, avoiding the need for the user to bend down and press buttons, as well as the multi-layer interface complex operations of APP (Application, application program), and the user can directly control the device through voice, improving user experience.

In the related art, a voice module (for example, a microphone array) is only provided on the cleaning device, and the sound is picked up through the provided voice module to achieve control of the cleaning device. However, when the cleaning device returns to the base station, the voice module in the cleaning device will be blocked by the base station, making it impossible to pick up sounds and thus making it impossible to achieve semantic recognition of voice. In addition, the cleaning device will also generate noise when running, which affects the recognition effect of voice control instructions. For such a manner that the voice controls the running of the device, the sensitivity of voice control is low. In addition, when the cleaning device leaves the base station for cleaning, the user must find the position of the cleaning device and follow it, so as to achieve the voice control of the cleaning device.

Figure 3:
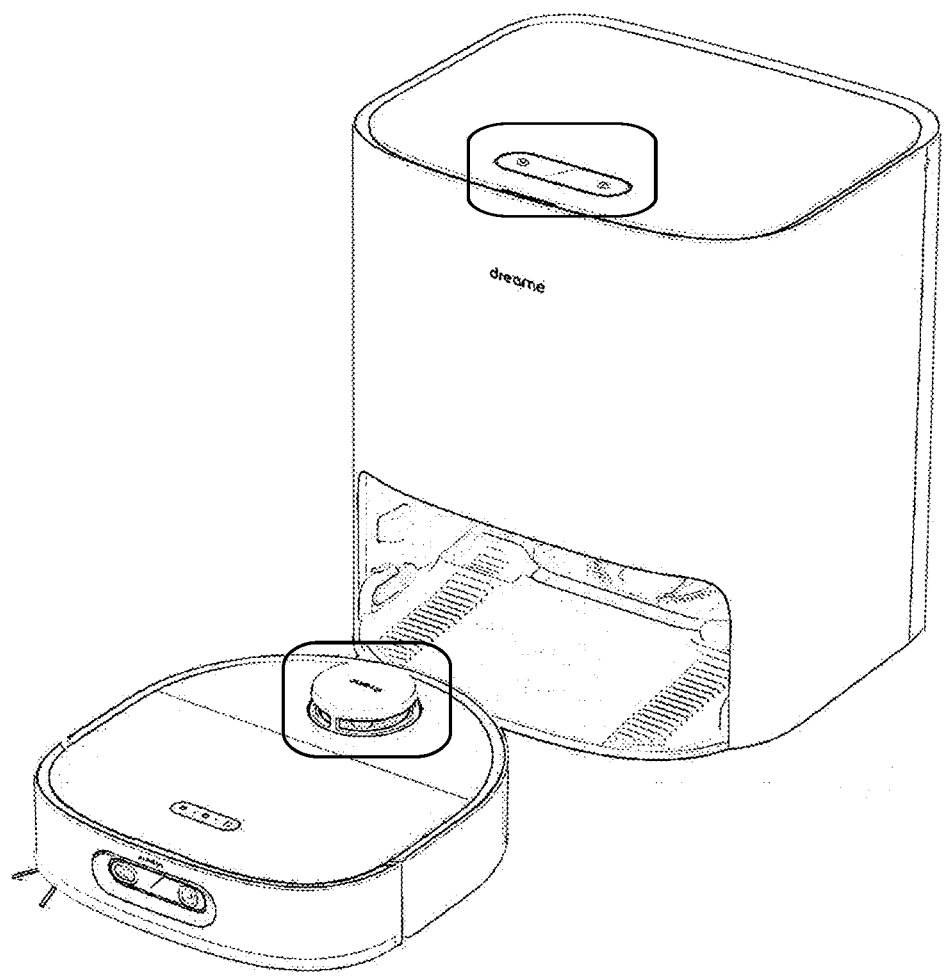
FIG. 3 is a schematic diagram of an optional voice module of a cleaning device and a base station according to an embodiment of the present disclosure.

In the embodiment, a sound pickup module (for example, a microphone array) may be respectively provided on the cleaning device and the base station. For example, as shown in FIG. 3, the sound pickup module can be respectively provided on the sweeping robot and the base station. In addition, a wireless communication module may also be provided on the cleaning device and the base station, and the mutual control of the cleaning device and the base station may be realized through the wireless communication module. For example, the sweeping robot has a voice recognition module and a wireless communication module inside; the base station has a voice recognition module and a wireless communication module inside; and the base station and the sweeping robot may exchange data and achieve mutual control through a local wireless network or a cloud service.

Figure 4:
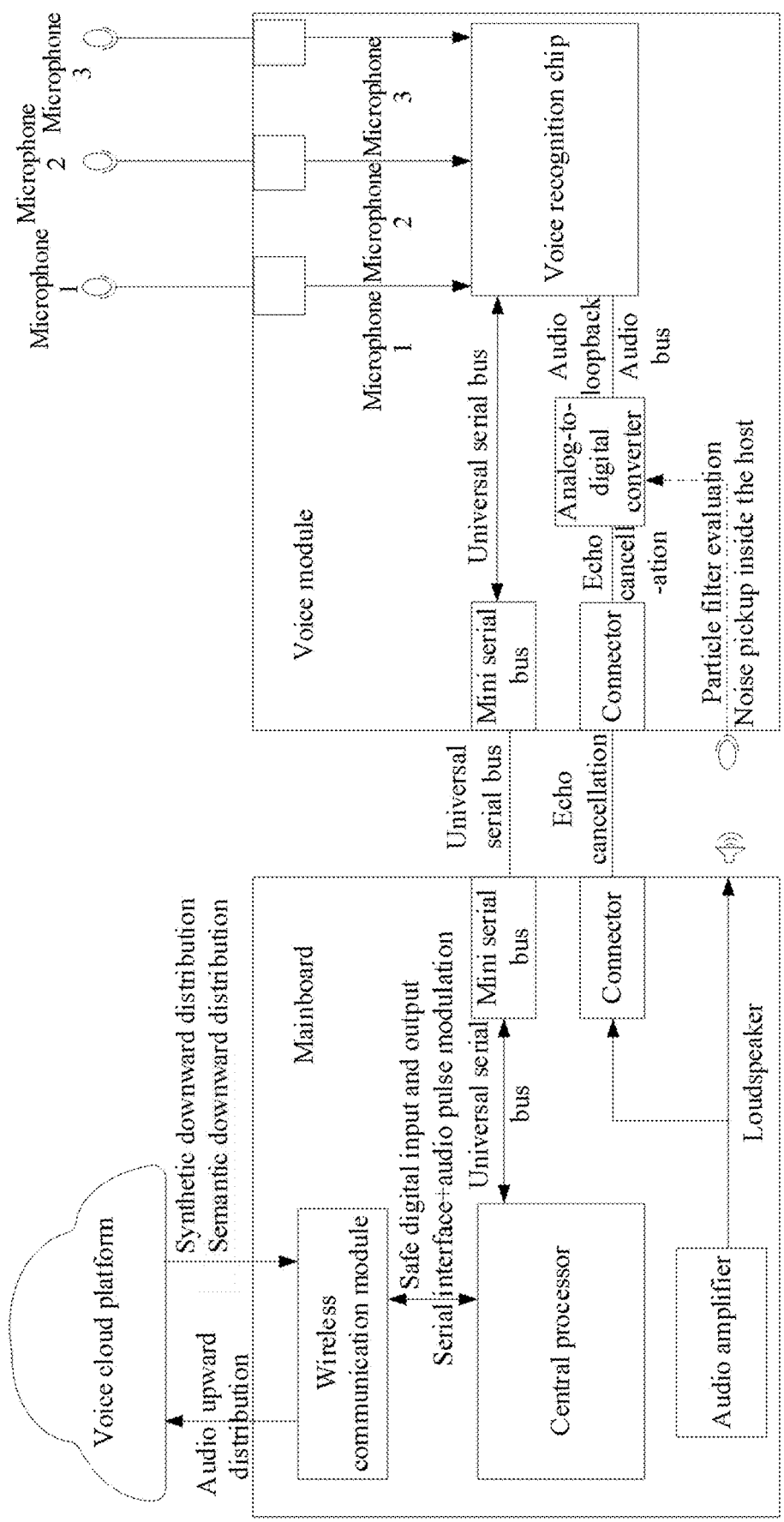
FIG. 4 is a hardware framework diagram of an optional cleaning device according to an embodiment of the present disclosure.

Exemplarily, FIG. 4 shows relevant parts of the voice interaction function of the cleaning device. As shown in FIG. 4, the cleaning device is provided with a voice collection part (i.e., 3-4 microphone arrays). Through the voice collection part, the cleaning device may collect voice data within its own collection range to obtain the voice data. The cleaning device is further provided with a voice recognition module (i.e., a voice recognition chip), which may recognize the voice data collected by the voice collection part. The cleaning device is further provided with a wireless communication module, through which data interaction with the base station may be achieved.

Figure 5:
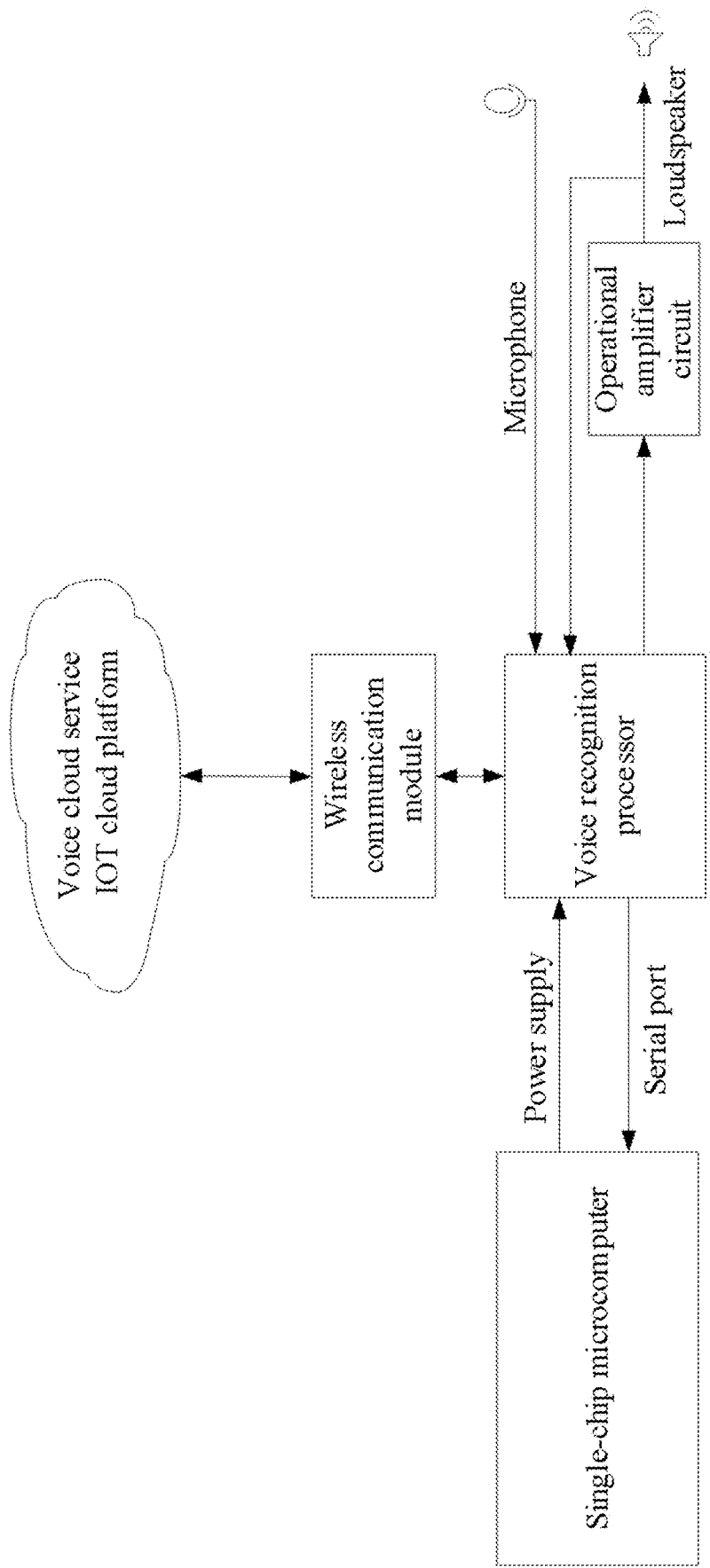
FIG. 5 is a hardware framework diagram of an optional base station according to an embodiment of the present disclosure.

Exemplarily, FIG. 5 shows relevant parts of the voice interaction function of the base station. The base station is also provided with a collection part (i.e., a microphone), a voice recognition module, and a wireless communication module. The base station may collect voice data through the collection part, and may recognize the voice data collected by the voice collection part through the voice recognition module. At the same time, through the wireless communication module, the base station may transmit the voice data that recognize the wake-up instruction to the cleaning device for recognition and processing.

The cleaning device and base station may be woken up by the same wake-up instruction. Here, the wake-up instruction is to wake up the voice interaction function of the corresponding device, so that control instruction collection can be performed through the device which is woken up. The use object (i.e., the user) may send a first wake-up instruction in need of using the cleaning device or the base station. In some scenarios, the cleaning device and the base station may simultaneously collect voice data corresponding to the first wake-up instruction to determine that the device may be woken up. The collected voice data are first voice data and second voice data, respectively. A voice feature of the first voice data is a first voice feature, and a voice feature of the second voice data is a second voice feature.

The operation of judging the device to be woken up in the cleaning device and the base station may be executed by the cleaning device, the base station, or the cloud platform. For scenarios executed by the cleaning device, the cleaning device may collect the first voice data, and extract the first voice feature from the first voice data in a case that the first wake-up instruction is recognized from the first voice data. For scenarios executed by the base station or the cloud platform, the base station or the cloud platform may receive the first voice data sent by the cleaning device and extract the first voice feature from the first voice data, or may receive the first voice feature sent by the cleaning device.

When the first voice data is recognized to obtain the first voice feature, an energy feature and a volume intensity feature may be extracted from the first voice data. The extracted energy feature and volume intensity feature may be one type of voice features. The voice features may also include other types of features, which are not limited here, as long as the extracted voice feature may characterize voice quality.

Step S204, acquiring a second voice feature of second voice data collected by the base station, where the second voice data are voice data corresponding to the first wake-up instruction, and the first wake-up instruction is used to wake up at least one of the cleaning device and the base station.

In the embodiment, the second voice feature of the second voice data collected by the base station may also be acquired. The second voice data are voice data corresponding to the first wake-up instruction, and the first wake-up instruction is also used to wake up the base station. The manner of acquiring the second voice feature is similar to that of acquiring the first voice feature. For scenarios executed by the cleaning device or the cloud platform, the cleaning device or the cloud platform may receive the second voice data sent by the base station and extract the second voice feature from the second voice data, or may receive the second voice feature sent by the base station. For scenarios executed by the base station, the base station may collect the second voice data, and extract the second voice feature from the second voice data in a case that the first wake-up instruction is recognized from the second voice data.

When the second voice data is recognized to obtain the second voice feature, an energy feature and a volume intensity feature may be extracted from the second voice data. The extracted energy feature and volume intensity feature may be one type of voice features. The voice features may also include other types of features, which is not limited here, as long as the extracted voice feature may characterize voice quality.

Step S206, selecting a first device to be woken up from the cleaning device and the base station according to the first and second voice features, and waking up the first device, where the first device in a wake-up state is configured to respond to a voice instruction sent by the use object.

In the embodiment, after acquiring the first and second voice features, the cleaning device may select a device to be woken up (i.e., the first device) from the cleaning device and the base station according to the first and second voice features, and wake up the device. Optionally, for scenarios executed by the cleaning device, if the first device is the cleaning device, a voice interaction function of the device may be directly woken up, and if the first device is the base station, wake-up indication information may be sent to the base station to indicate a voice interaction function that wakes up the base station; for scenarios executed by the cloud platform, wake-up indication information may be sent to the first device to indicate a voice interaction function that wakes up the first device; and for scenarios executed by the base station, if the first device is the base station, a voice interaction function of the device may be directly woken up, and if the first device is the cleaning device, wake-up indication information may be sent to the cleaning device to indicate a voice interaction function that wakes up the cleaning device.

The above selection rule for a device to be woken up according to the voice feature may be selected based on the volume intensity feature in the voice feature. Exemplarily, when the volume intensity corresponding to the first voice feature is greater than that of the second voice feature, it may be considered that the cleaning device is closer to the use object. At this time, selecting the cleaning device to respond to the wake-up instruction is beneficial for the subsequent collection and recognition of the voice control instruction, i.e., determining the cleaning device as the first device to be woken up. When the volume intensity corresponding to the second voice feature is greater than that of the first voice feature, it may be considered that the base station is closer to the use object. At this time, selecting the base station to respond to the wake-up instruction is beneficial for the subsequent collection and recognition of the voice control instruction, i.e., determining the base station as the first device to be woken up.

After being woken up, the first device may respond to the first wake-up instruction, for example, by broadcasting a voice message "I'm here" and adjusting its voice interaction function from a sleep state to a wake-up state, so as to respond to the subsequent voice instruction sent by the use object.

Through the above steps S202 to S206, the first voice feature of the first voice data collected by the cleaning device is acquired, where the first voice data are voice data corresponding to a first wake-up instruction sent by the use object, and the first wake-up instruction is used to wake up at least one of the cleaning device and the base station; the second voice feature of the second voice data collected by the base station is acquired, where the second voice data are voice data corresponding to the first wake-up instruction; and the first device to be woken up is selected from the cleaning device and the base station according to the first and second voice features, and the first device is woken up, where the first device in the wake-up state is used to respond to the voice instruction sent by the use object, which solves the problem of low sensitivity in device voice control due to the inability to accurately pick up the voice control instructions in the voice control methods for the device in the related art, improves the accuracy of parsing the voice control instructions, and enhances the sensitivity in the device voice control.

In an exemplary embodiment, acquiring the first voice feature of the first voice data collected by the cleaning device includes:

S11, performing voice collection through a voice collection part of the cleaning device to obtain the first voice data; and S12, performing voice feature extraction on the first voice data to obtain the first voice feature in a case that the first wake-up instruction is recognized from the first voice data.

In the embodiment, the cleaning device executes the step of extracting the first voice feature. The cleaning device may be provided with the voice collection part, i.e., the aforementioned voice module. Through the voice collection part, voice collection may be performed to obtain the first voice data. For the collected first voice data, the cleaning device may perform voice recognition on the first voice data to determine whether the wake-up instruction of the cleaning device is recognized.

When the first wake-up instruction is recognized from the first voice data, the cleaning device may be directly woken up. Optionally, in order to determine which device is more suitable for waking up in the cleaning device and the base station, the cleaning device may perform feature extraction on the first voice data to obtain the first voice feature. The above first voice feature may be an energy feature, a volume feature, etc., which is not limited here.

Exemplarily, as shown in FIG. 4, the cleaning device may collect voice data through a microphone, and there may be some noise during the running of the cleaning device. In order to improve the collection effect of voice data, noise may be picked up by particle filter algorithm, and the voice data may be processed by an echo cancellation technology to obtain the denoised voice data, which can then be recognized by a voice recognition chip. When recognizing that the voice data include the wake-up instruction, the cleaning device may transmit the voice data to the central processor for feature extraction through the universal serial bus, thereby determining the voice feature corresponding to the voice data.

Through the embodiment, the recognition and feature extraction of voice data collected by the cleaning device can facilitate the subsequent determination of the device to be woken up, which can improve the accuracy of the determination of the device to be woken up.

In an exemplary embodiment, acquiring the second voice feature of the second voice data collected by the base station includes:

S21, receiving the second voice data that match the first voice data from the base station; and performing voice feature extraction on the second voice data to obtain the second voice feature; or S22, receiving the second voice feature that matches the first voice feature from the base station, where the second voice feature is obtained by performing voice feature extraction on the second voice data.

In the embodiment, the operation of judging the device to be woken up in the cleaning device and the base station is executed by the cleaning device. The manner in which the cleaning device acquires the second voice feature of the second voice data collected by the base station may include one of the following:

Manner 1: receiving the second voice data that match the first voice data from the base station; and performing the voice feature extraction on the second voice data to obtain the second voice feature.

The base station may collect the second voice data in a similar manner to that in which the aforementioned cleaning device collects the first voice data, and send the second voice data to the cleaning device in a case that the first wake-up instruction is recognized from the second voice data. The cleaning device may receive the second voice data that match the first voice data from the base station, and perform the voice feature extraction on the second voice data in a similar manner to the aforementioned manner of extracting the first voice feature to obtain the second voice feature.

Optionally, as shown in FIG. 4, the cleaning device may interact with the base station through a wireless communication module. The cleaning device may directly receive the second voice data that match the first voice data sent by the base station, and perform the voice feature extraction on the received second voice data through a processor to obtain the second voice feature.

Manner 2: receiving the second voice feature that matches the first voice feature from the base station, where the second voice feature is obtained by performing the voice feature extraction on the second voice data.

The base station may collect the second voice data in a similar manner to that in which the aforementioned cleaning device collects the first voice data, and in a case that the first wake-up instruction is recognized from the second voice data, perform the voice feature extraction on the second voice data in a similar manner to that in which the aforementioned cleaning device extracts the first voice feature to obtain the second voice feature, and send the obtained second voice feature to the cleaning device, where the cleaning device may receive the second voice feature sent by the base station.

Optionally, as shown in FIG. 5, the base station may perform the feature extraction on the second voice data through the central processor after collecting the second voice data, and send the second voice feature to the cleaning device after extracting the second voice feature. In response to the received second voice feature, the cleaning device may perform subsequent comparison processing between voice features to determine that the second voice feature received from the base station matches the first voice feature.

Through the embodiment, the device to be woken up is determined by receiving the voice data or the voice feature from the base station by the cleaning device, which can reduce the demand for hardware resources of the base station.

In an exemplary embodiment, after waking up the first device, the above method further includes:
S31, performing voice collection through a voice collection part of the cleaning device to obtain third voice data;
S32, recognizing a second wake-up instruction from the third voice data, where the second wake-up instruction is used to wake up at least one of the cleaning device and the base station; and
S33, waking up the cleaning device in a case that no voice data matching the third voice data are received from the base station within a first time period, or no voice feature matching a voice feature of the third voice data is received from the base station within the first time period.

In the embodiment, after waking up the first device, the voice collection part of the cleaning device may continue to perform voice collection to obtain the third voice data. In a case that the second wake-up instruction is recognized from the third voice data, it may be waited to receive voice data that match the third voice data sent by the base station or a voice feature that matches the voice feature of the third voice data sent by the base station within the first time period. Here, the second wake-up instruction may be used to wake up at least one of the cleaning device and the base station. The process of collecting voice data and recognizing voice data is similar to that in the aforementioned embodiment, which will not be described again here.

If no voice data that match the third voice data are received from the base station within the first time period, or no voice feature that matches the voice feature of the third voice data is received from the base station within the first time period, the cleaning device may consider that the base station has not collected voice data corresponding to the second wake-up instruction, and the cleaning device, i.e., the voice interaction function of the cleaning device, may directly be woken up.

For example, when the base station is in the living room, and the cleaning device and the user are both in the bedroom, the user sends a wake-up instruction. At this time, due to the distance and the barrier of the door, the base station cannot collect the voice data corresponding to the wake-up instruction sent by the user. At this time, the cleaning device may be woken up and complete the subsequent voice interaction with the user.

If the subsequent voice instruction of the user is to query the current state of the base station, the cloud platform may send the voice instruction to the base station after recognizing the corresponding voice instruction. Alternatively, the cleaning device sends a voice instruction to the base station after recognizing the corresponding voice instruction, and the base station may respond to the voice instruction and query its current state, for example, water tank margin state, current power state, etc. The current state of the base station is played through its own voice playing module (for example, loudspeaker) or the voice playing module of the cleaning device.

Through the embodiment, when no matching voice data are received from the base station within the set time period, the cleaning device is directly woken up for subsequent voice interaction, which can improve the efficiency of voice interaction.

In an exemplary embodiment, after waking up the first device, the above method further includes:
S41, receiving fourth voice data from the base station; searching for voice data that match the fourth voice data collected by the cleaning device in a case that a third wake-up instruction is recognized from the fourth voice data, where the third wake-up instruction is used to wake up at least one of the cleaning device and the base station; and sending first indication information to the base station in a case that no voice data that match the fourth voice data collected by the cleaning device are found, where the first indication information is used to indicate determining to wake up the base station; or
S42, receiving a third voice feature from the base station, where the third voice feature is obtained by performing voice feature extraction on fifth voice data collected by the base station in a case that a fourth wake-up instruction is recognized from the fifth voice data, and the fourth wake-up instruction is used to wake up at least one of the cleaning device and the base station; searching for a voice feature that matches the third voice feature in voice features of voice data collected by the cleaning device; and sending second indication information to the base station in a case that no voice feature that matches the third voice feature is found, where the second indication information is used to indicate determining to wake up the base station.

In the embodiment, the cleaning device may receive voice data sent by the base station (i.e., the fourth voice data), which is sent to the cleaning device after the base station collects the fourth voice data and recognizes the third wake-up instruction from the fourth voice data. Here, the third wake-up instruction may be used to wake up at least one of the base station and the cleaning device. The cleaning device may recognize the fourth voice data, and when recognizing third wake-up instruction, the cleaning device may search for the voice data collected by itself (for example, based on the collection time of the voice data) to determine whether the voice data that match the fourth voice data are found.

If the matching voice data are found, the device to be woken up may be selected from the cleaning device and the base station in the same or similar manner to that in the aforementioned embodiment. If no matching voice data are found, the cleaning device may send the first indication information to the base station, thereby waking up the base station.

Optionally, the cleaning device may receive the voice feature (i.e., the third voice feature) sent by the base station, the third voice feature is obtained by performing voice feature extraction on the fifth voice data collected by the base station in a case that the fourth wake-up instruction is recognized from the fifth voice data, and the obtained third voice feature may be sent to the cleaning device. Here, the fourth wake-up instruction may be used to wake up at least one of the base station and the cleaning device.

The cleaning device may compare the third voice feature and search in the voice features extracted by itself (for example, based on the extraction time of the voice features) to determine whether the voice feature that matches the third voice feature is found.

If the matching voice data or voice feature is found, the device to be woken up may be selected from the cleaning device and the base station in the same or similar manner to that in the aforementioned embodiment. If no matching voice data or voice feature is found, the cleaning device may send the second indication information to the base station, thereby waking up the base station.

For example, when the sweeping robot enters the base station, the voice module of the sweeping robot is wrapped by the base station, cannot pick up sounds, and thus cannot parse a voice instruction and realize the voice control. Sounds may be picked up through the voice module of the base station, so as to realize the control of the sweeping robot through the base station.

Through the embodiment, after receiving the voice data or feature from the base station, if no matching voice data or feature is found, the base station may be directly woken up, which can improve the timeliness of waking up the device and enhance the efficiency of voice interaction.

In an exemplary embodiment, acquiring the second voice feature of the second voice data collected by the base station includes:
   S51, performing voice collection through a voice collection part of the base station to obtain the second voice data; and
   S52, performing voice feature extraction on the second voice data to obtain the second voice feature in a case that the first wake-up instruction is recognized from the second voice data.

In the embodiment, the step of extracting the second voice feature is executed by the base station. The base station may be provided with the voice collection part, i.e., the aforementioned voice module. Through the voice collection part, voice collection may be performed to obtain the second voice data. For the collected second voice data, the base station may perform voice recognition on the second voice data to determine whether the wake-up instruction of the base station is recognized.

In a case that the first wake-up instruction is recognized from the second voice data, the base station may directly perform a wake-up operation. Optionally, in order to determine which device is more suitable for waking up in the cleaning device and base station, the base station may perform feature extraction on the second voice data to obtain the second voice feature. The second voice feature mentioned above may be an energy feature, a volume feature, etc., which is not limited here.

Exemplarily, as shown in FIG. 5, the base station may collect voice data through a microphone and recognize the voice data through a voice recognition chip. When recognizing that the voice data include the wake-up instruction, the base station may transmit the voice data to the central processor for feature extraction through the universal serial bus, thereby determining the voice feature corresponding to the voice data.

Through the embodiment, the recognition and feature extraction of voice data collected by the base station facilitates the subsequent determination of the device to be woken up, which can improve the accuracy of the determination of the device to be woken up.

In an exemplary embodiment, acquiring the first voice feature of the first voice data collected by the cleaning device includes:
   S61, receiving the first voice data that match the second voice data from the cleaning device; and performing voice feature extraction on the first voice data to obtain the first voice feature; or
   S62, receiving the first voice feature that matches the second voice feature from the cleaning device, where the first voice feature is obtained by performing voice feature extraction on the first voice data.

In the embodiment, the operation of judging the device to be woken up in the cleaning device and the base station is executed by the base station. The manner in which the base station acquires the first voice feature of the first voice data collected by the cleaning device may include one of the following:

Manner 1: receiving the first voice data that match the second voice data from the cleaning device; and performing voice feature extraction on the first voice data to obtain the first voice feature.

The cleaning device may collect the first voice data in a similar manner to that in the aforementioned embodiment, and send the first voice data to the base station after recognizing the first wake-up instruction from the first voice data. The base station may receive the first voice data that match the second voice data from the cleaning device, and perform voice feature extraction on the first voice data in a similar manner to that in the aforementioned embodiment to obtain the first voice feature.

Optionally, as shown in FIG. 5, the cleaning device and the base station may interact with each other through a wireless communication module. The base station may directly receive the first voice data that match the second voice data sent by the cleaning device, and perform voice feature extraction on the received first voice data through the processor to obtain the first voice feature.

Manner 2: receiving the first voice feature that matches the second voice feature from the cleaning device, where the first voice feature is obtained by performing voice feature extraction on the first voice data.

The cleaning device may collect the first voice data in a similar manner to that in the aforementioned embodiment, and in a case that the first wake-up instruction is recognized from the first voice data, the cleaning device may perform voice feature extraction on the first voice data to obtain the first voice feature, and send the obtained first voice feature to the base station, where the base station may receive the first voice feature sent by the cleaning device.

Optionally, as shown in FIG. 4, the cleaning device may perform feature extraction on the first voice data through the central processor after collecting the first voice data, and send the first voice feature to the base station after extracting the first voice feature. In response to the received first voice feature, the base station may perform subsequent comparison between voice features, i.e., compare the second voice feature with the first voice feature, to determine the first voice feature that matches the second voice feature received from the cleaning device.

Through the embodiment, the device to be woken up is determined by receiving the voice data or voice feature from the cleaning device by a base station. Compared with the solution of executing the above process by the cleaning device, the accuracy of waking up the device can be improved (the location of the base station is fixed relative to the cleaning device, which is more convenient for voice interaction), and the convenience of determining the device to be woken up can be improved.

In an exemplary embodiment, after waking up the first device, the above method further includes:

S71, performing voice collection through a voice collection part of the base station to obtain sixth voice data;

S72, recognizing a fifth wake-up instruction from the sixth voice data, where the fifth wake-up instruction is used to wake up at least one of the cleaning device and the base station; and S73, waking up the base station in a case that no voice data matching the sixth voice data are received from the cleaning device within a second time period, or no voice feature matching a voice feature of the sixth voice data is received from the cleaning device within the second time period.

In the embodiment, after waking up the first device, the voice collection part of the base station may continue to perform voice collection to obtain the sixth voice data. In a case that the fifth wake-up instruction is recognized from the sixth voice data, it may be waited to receive voice data that match the sixth voice data sent by the cleaning device or a voice feature that matches the voice feature of the sixth voice data sent by the cleaning device within the second time period. Here, the fifth wake-up instruction may be used to wake up at least one of the base station and the cleaning device. The processes of collecting voice data, recognizing the voice data, and waiting to receive the matching voice data from the cleaning device is similar to that in the aforementioned embodiment, which will not be described again here.

If no voice data matching the sixth voice data are received from the cleaning device within the second time period, or no voice feature matching the voice feature of the sixth voice data is received from the cleaning device within the second time period, the base station may consider that the cleaning device has not collected the voice data corresponding to the fifth wake-up instruction, and the base station, i.e., the voice interaction function of the base station may be woken up.

Through the embodiment, when no matching voice data are received from the cleaning device within the set time period, the base station is directly woken up for subsequent voice interaction, which can improve the efficiency of the voice interaction.

In an exemplary embodiment, after waking up the first device, the above method further includes:

S81, receiving seventh voice data from the cleaning device; searching for voice data that match the seventh voice data collected by the base station in a case that a sixth wake-up instruction is recognized from the seventh voice data, where the sixth wake-up instruction is used to wake up at least one of the cleaning device and the base station; and sending third indication information to the cleaning device in a case that no voice data matching the seventh voice data collected by the base station are found, where the third indication information is used to indicate determining to wake up the cleaning device; or S82, receiving a fourth voice feature from the cleaning device, where the fourth voice feature is obtained by performing voice feature extraction on eighth voice data collected by the cleaning device in a case that a seventh wake-up instruction is recognized from the eighth voice data, and the seventh wake-up instruction is used to wake up at least one of the cleaning device and the base station; searching for a voice feature that matches the fourth voice feature in voice features of voice data collected by the base station; and sending fourth indication information to the cleaning device in a case that no voice feature matching the fourth voice feature is found, where the fourth indication information is used to indicate determining to wake up the cleaning device.

In the embodiment, the base station may receive voice data (i.e., the seventh voice data) sent by the cleaning device, which is sent to the base station after the cleaning device collects the seventh voice data and recognizes the sixth wake-up instruction from the seventh voice data. Here, the sixth wake-up instruction may be used to wake up at least one of the cleaning device and the base station.

The base station may recognize the seventh voice data, and when the sixth wake-up instruction is recognized, the base station may search for the voice data collected by itself (for example, based on the collection time of the voice data) to determine whether the voice data that match the seventh voice data are found.

If the matching voice data are found, the base station may select the device to be woken up from the cleaning device and the base station in the same or similar manner to that in the aforementioned embodiment. If no matching voice data are found, the base station may send the third indication information to the cleaning device, thereby waking up the cleaning device.

Optionally, the base station may receive a voice feature (i.e., the fourth voice feature) sent by the cleaning device, the fourth voice feature is obtained by performing voice feature extraction on the eighth voice data in a case that the cleaning device collects the eighth voice data and recognizes the seventh wake-up instruction from the eighth voice data, and the obtained fourth voice feature may be sent to the base station. Here, the seventh wake-up instruction may be used to wake up at least one of the cleaning device and the base station. The base station may compare the fourth voice feature and search in the voice features extracted by itself (for example, based on the extraction time of the voice features) to determine whether the voice feature that matches the fourth voice feature is found.

If the matching voice feature is found, the base station may select the device to be woken up from the cleaning device and the base station in the same or similar manner to that in the aforementioned embodiment. If no matching voice feature is found, the base station may send the fourth indication information to the cleaning device, thereby waking up the cleaning device.

Through the embodiment, after receiving the voice data or voice feature from the cleaning device, if no matching voice data or voice feature is found, the cleaning device may be directly woken up, which can improve the timeliness of waking up the device and enhance the efficiency of voice interaction.

In an exemplary embodiment, the first voice feature includes a first voice intensity of the first voice data, and the second voice feature includes a second voice intensity of the second voice data. The priority device to be woken up may be selected from the cleaning device and the base station through the voice intensity feature.

Correspondingly, selecting the first device to be woken up from the cleaning device and base station according to the first and second voice features includes:
- S91, determining the cleaning device as the first device to be waken up in a case that the first voice intensity is greater than the second voice intensity, and a difference between the first voice intensity and the second voice intensity is greater than or equal to a target intensity threshold;
- S92, determining the base station as the first device to be waken up in a case that the first voice intensity is less than the second voice intensity, and the difference between the first voice intensity and the second voice intensity is greater than or equal to the target intensity threshold; and
- S93, determining a preset device in the cleaning device and the base station as the first device to be waken up in a case that the difference between the first voice intensity and the second voice intensity is less than the target intensity threshold.

The cleaning device may compare the first voice intensity and the second voice intensity, determine the larger voice intensity between the first voice intensity and the second voice intensity, as well as a voice intensity difference between the two, and determine the device to be woken up based on the larger voice intensity and the voice intensity difference. The above difference is the absolute value of the difference between the first voice intensity and the second voice intensity.

If the first voice intensity is greater than the second voice intensity, and the difference between the first voice intensity and the second voice intensity is greater than or equal to the target intensity threshold, it is indicated that the relative distance between the cleaning device and the base station is large, and the cleaning device is closer to the use object than the base station. Using a device closer to the use object as the device to be woken up facilitates subsequent voice interaction with the use object. At this time, the cleaning device may be determined as the first device to be woken up.

If the first voice intensity is less than the second voice intensity, and the difference between the first voice intensity and the second voice intensity is greater than or equal to the target intensity threshold, it is indicated that the relative distance between the cleaning device and the base station is large, and the base station is closer to the use object than the cleaning device. Using the device closer to the use object as the device to be waken up facilitates subsequent voice interaction with the use object. At this time, the base station may be determined as the first device to be woken up.

If the difference between the first voice intensity and the second voice intensity is less than the target intensity threshold, it is indicated that the relative distance between the cleaning device and the use object and the relative distance between the base station and the use object are similar. The preset device in the cleaning device and the base station may be determined as the first device to be woken up. The preset device may be a cleaning device or a base station, which is not limited in the embodiment.

For example, the user may directly operate the base station through voice, and operate the sweeping robot through voice. The sweeping robot and the base station are located in the same space, and their voice recognition modules may make decisions on their own, determine the user's operation intention, and execute corresponding instructions, while the other one continues to maintain its original state, such as standby or original operation state.

Through the embodiment, the priority of waking up the device is determined according to the voice intensity feature, thereby ensuring the quality of voice interaction between the woken-up device and the use object, and improving the user's interaction experience.

In an exemplary embodiment, waking up the first device includes:
- S101, sending fifth indication information to the first device, where the fifth indication information is used to indicate determining to wake up the first device.

In the embodiment, waking up the first device may be sending the fifth indication information to the first device. In response to the received fifth indication information, the first device may switch the state of its own voice interaction function to the wake-up state, and perform a wake-up response. The wake-up response may be a voice response, an indicator light flashing response, or responses in other manners, which is not limited herein.

Exemplarily, when the first device is the base station, the cleaning device may send the fifth indication information to the base station. In response to the received indication information, the base station may make a corresponding voice response through an operational amplifier module shown in FIG. 5, such as broadcasting "I'm here".

Through the embodiment, waking up the device to be woken up through indication information can improve the convenience of device control.

In an exemplary embodiment, after waking up the first device, the above method further includes:
- S111, receiving ninth voice data sent by the first device, where the ninth voice data are voice data collected by the first device in a wake-up state;
- S112, in a case that a target voice instruction sent by the use object is recognized from the ninth voice data, determining a second device controlled by the target voice instruction in the cleaning device and the base station; and
- S113, controlling the second device to execute a target device operation corresponding to the target voice instruction.

In the embodiment, after waking up the first device, the use object can continue to send the voice instruction to control the device to execute related device operations. The first device may send the voice data (i.e., the ninth voice data) collected in the wake-up state to a cloud platform through a wireless communication module.

After receiving the ninth voice data sent by the first device, the cloud platform may perform semantic parsing on it. In a case that the target voice instruction sent by the use object is recognized from the ninth voice data, the second device controlled by the target voice instruction may be determined from the cleaning device and the base station according to the semantics of the parsed target voice instruction, and the target voice instruction will be sent to the second device to control the second device to execute a device operation corresponding to the target voice instruction.

When the first device is the base station, and the second device is the cleaning device, voice interaction between the use object and the base station can be achieved, thereby jointly controlling the cleaning device. Exemplarily, the user controls the sweeping robot through voice, and the sweeping robot may execute corresponding instructions. When the user controls the base station through voice, the base station parses user instructions, and may control the base station or the sweeping robot.

For example, when the sweeping robot leaves the base station to operate, the user does not need to follow or search for the position of the sweeping robot. Through the voice interaction with the base station, the user indirectly controls the sweeping robot, such as pausing, adjusting settings, and backwashing. When the sweeping robot leaves the base station to operate, the noise of the sweeping robot body is relatively high. The user indirectly controls the sweeping robot through the voice interaction with the base station, such as pausing, adjusting settings, and backwashing, etc., to avoid the voice interaction with the sweeping robot generating high noise, the voice recognition effect of which is not good.

Through the embodiment, by receiving voice data collected by the device that is woken up and controlling the corresponding device to execute the device operation based on the voice instruction recognized from the voice data, the sensitivity in the voice control on the running of the device can be improved.

It should be noted that for the sake of simplicity, each aforementioned embodiment of the method is expressed as a series of action combinations. However, those skilled in the art should be aware that the present disclosure is not limited by the order of the described actions, since certain steps may be performed in other orders or simultaneously according to the present disclosure. Secondly, those skilled in the art should also be aware that the embodiments described in the description are all preferred embodiments, and the actions and modules involved may not be necessary for the present disclosure.

Through the description of the above implementations, those skilled in the art may clearly understand that the methods according to the above embodiments may be achieved by software with a necessary general hardware platform. Of course, the methods may also be implemented by hardware. However, in many cases, the former is a preferred implementation. Based on such an understanding, the technical solutions of the present disclosure essentially or the part contributing to the prior art may be embodied in the form of a software product. The software product is stored in a storage medium (such as ROM (Read-Only Memory)/RAM (Random Access Memory), a magnetic disk, or an optical disc), and includes several instructions for instructing a terminal device (which may be a mobile phone, a computer, a server, a network device, or the like) to execute the method described in each embodiment of the present disclosure.

Figure 6:
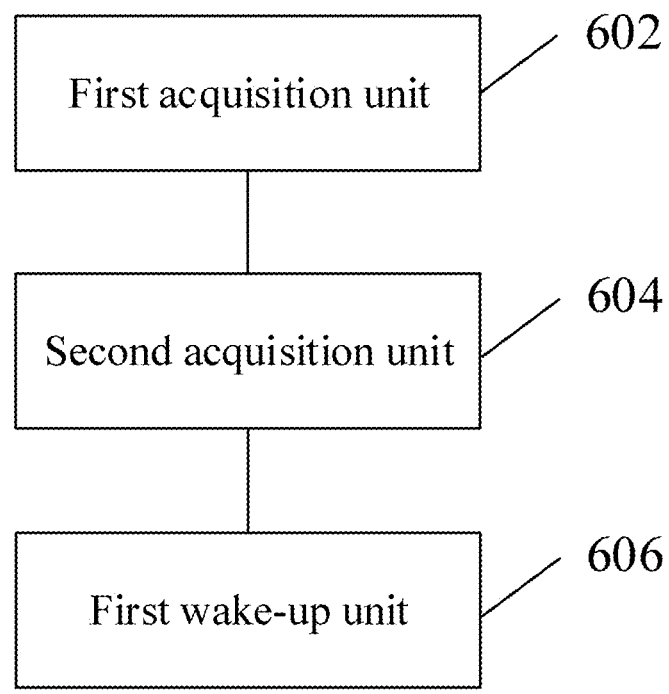
FIG. 6 is a structure diagram of an optional voice control apparatus for a device according to an embodiment of the present disclosure.

According to another aspect of an embodiment of the present disclosure, a voice control apparatus for a device for implementing the above voice control method for the device is further provided. FIG. 6 is a structure diagram of an optional voice control apparatus for a device according to an embodiment of the present disclosure, as shown in FIG. 6, the apparatus may include:

a first acquisition unit 602, configured to acquire a first voice feature of first voice data collected by a cleaning device, where the first voice data are voice data corresponding to a first wake-up instruction sent by a use object, and the first wake-up instruction is used to wake up at least one of the cleaning device and a base station;

a second acquisition unit 604 connected to the first acquisition unit 602 and configured to acquire a second voice feature of second voice data collected by the base station, where the second voice data are voice data corresponding to the first wake-up instruction; and a first wake-up unit 606 connected to the second acquisition unit 604 and configured to select a first device to be woken up from the cleaning device and the base station according to the first and second voice features, and wake up the first device, where the first device in a wake-up state is configured to respond to a voice instruction sent by the use object.

It should be noted that the first acquisition unit 602, the second acquisition unit 604 and the first wake-up unit 606 in the embodiment may be used to execute the above steps S202, S204 and S206, respectively.

Through the above modules, the first voice feature of the first voice data collected by the cleaning device is acquired, where the first voice data are voice data corresponding to the first wake-up instruction sent by the use object, and the first wake-up instruction is used to wake up at least one of the cleaning device and the base station; the second voice feature of the second voice data collected by the base station is acquired, where the second voice data are voice data corresponding to the first wake-up instruction; and the first device to be woken up is selected from the cleaning device and the base station according to the first voice feature and the second voice feature, and the first device is woken up, where the first device in the wake-up state is configured to respond to the voice instruction sent by the use object, which solves the problem of low sensitivity in the device voice control due to the inability to accurately pick up the voice control instructions in the voice control methods for the device in the related art, improves the accuracy of parsing the voice control instructions, and enhances the sensitivity in the device voice control.

In an exemplary embodiment, the first acquisition unit includes:

a first collection module, configured to perform voice collection through a voice collection part of the cleaning device to obtain the first voice data; and a first extraction module, configured to perform voice feature extraction on the first voice data to obtain the first voice feature in a case that the first wake-up instruction is recognized from the first voice data.

In an exemplary embodiment, the second acquisition unit includes:

a first receiving module, configured to receive the second voice data that match the first voice data from the base station; and a first extraction module, configured to perform voice feature extraction on the second voice data to obtain the second voice feature; or a second receiving module, configured to receive the second voice feature that matches the first voice feature from the base station, where the second voice feature is obtained by performing the voice feature extraction on the second voice data.

In an exemplary embodiment, the above apparatus further includes:
- a first collection unit, configured to perform voice collection through a voice collection part of the cleaning device to obtain third voice data after waking up the first device;
- a first recognition unit, configured to recognize a second wake-up instruction from the third voice data, where the second wake-up instruction is used to wake up at least one of the cleaning device and the base station; and
- a second wake-up unit, configured to wake up the cleaning device in a case that no voice data matching the third voice data are received from the base station within a first time period, or no voice feature matching a voice feature of the third voice data is received from the base station within the first time period.

In an exemplary embodiment, the above apparatus further includes:
- a first receiving unit, configured to receive fourth voice data from the base station after waking up the first device; a first search unit, configured to search for voice data that match the fourth voice data collected by the cleaning device in a case that a third wake-up instruction is recognized from the fourth voice data, where the third wake-up instruction is used to wake up at least one of the cleaning device and the base station; and a first sending unit, configured to send first indication information to the base station in a case that no voice data matching the fourth voice data collected by the cleaning device are found, where the first indication information is used to indicate determining to wake up the base station; or
- a second receiving unit, configured to receive a third voice feature from the base station, where the third voice feature is obtained by performing voice feature extraction on fifth voice data collected by the base station in a case that a fourth wake-up instruction is recognized from the fifth voice data, and the fourth wake-up instruction is used to wake up at least one of the cleaning device and the base station; a second search unit, configured to search for a voice feature that matches the third voice feature in voice features of the voice data collected by the cleaning device; and a second sending unit, configured to send second indication information to the base station in a case that no voice feature matching the third voice feature is found, where the second indication information is used to indicate determining to wake up the base station.

In an exemplary embodiment, the second acquisition unit includes:
- a second collection module, configured to perform voice collection through a voice collection part of the base station to obtain the second voice data; and
- a second extraction module, configured to perform voice feature extraction on the second voice data to obtain the second voice feature in a case that the first wake-up instruction is recognized from the second voice data.

In an exemplary embodiment, the first acquisition unit includes:
- a third receiving module, configured to receive the first voice data that match the second voice data from the cleaning device; and a third extraction module, configured to perform voice feature extraction on the first voice data to obtain the first voice feature; or
- a fourth receiving module, configured to receive the first voice feature that matches the second voice feature from the cleaning device, where the first voice feature is obtained by performing voice feature extraction on the first voice data.

In an exemplary embodiment, the above apparatus further includes:
- a second collection unit, configured to perform voice collection through a voice collection part of the base station to obtain sixth voice data after waking up the first device;
- a second recognition unit, configured to recognize a fifth wake-up instruction from the sixth voice data, where the fifth wake-up instruction is used to wake up at least one of the cleaning device and the base station; and
- a third wake-up unit, configured to wake up the base station in a case that no voice data matching the sixth voice data are received from the cleaning device within a second time period, or no voice feature matching a voice feature of the sixth voice data is received from the cleaning device within the second time period.

In an exemplary embodiment, the above apparatus further includes:
- a third receiving unit, configured to receive seventh voice data from the cleaning device after waking up the first device; a third search unit, configured to search for voice data that match the seventh voice data collected by the base station in a case that a sixth wake-up instruction is recognized from the seventh voice data, where the sixth wake-up instruction is used to wake up at least one of the cleaning device and the base station; and a third sending unit, configured to send third indication information to the cleaning device in a case that no voice data matching the seventh voice data collected by the base station are found, where the third indication information is used to indicate determining to wake up the cleaning device; or
- a fourth receiving unit, configured to receive a fourth voice feature from the cleaning device, where the fourth voice feature is obtained by performing voice feature extraction on eighth voice data collected by the cleaning device in a case that a seventh wake-up instruction is recognized from the eighth voice data, and the seventh wake-up instruction is used to wake up at least one of the cleaning device and the base station; a fourth search unit, configured to search for a voice feature that matches the fourth voice feature in voice features of voice data collected by the base station; and a fourth sending unit, configured to send fourth indication information to the cleaning device in a case that no voice feature matching the fourth voice feature is found, where the fourth indication information is used to indicate determining to wake up the cleaning device.

In an exemplary embodiment, the first voice feature includes a first voice intensity of the first voice data, and the second voice feature includes a second voice intensity of the second voice data; and the first wake-up unit includes:
- a first determination module, configured to determine the cleaning device as the first device to be waken up in a case that the first voice intensity is greater than the second voice intensity, and a difference between the first voice intensity and the second voice intensity is greater than or equal to a target intensity threshold;
- a second determination module, configured to determine the base station as the first device to be waken up in a case that the first voice intensity is less than the second voice intensity, and the difference between the first voice intensity and the second voice intensity is greater than or equal to the target intensity threshold; and a third determination module, configured to determine a preset device in the cleaning device and the base station as the first device to be waken up when the difference between the first voice intensity and the second voice intensity is less than the target intensity threshold.

In an exemplary embodiment, the second wake-up unit includes:

a sending module, configured to send fifth indication information to the first device, where the fifth indication information is used to indicate determining to wake up the first device.

In an exemplary embodiment, the above apparatus further includes:

a fifth receiving unit, configured to receive ninth voice data sent by the first device after waking up the first device, where the ninth voice data are voice data collected by the first device in the wake-up state;

a determination unit, configured to determine a second device controlled by a target voice instruction sent by the use object in the cleaning device and the base station in a case that the target voice instruction is recognized from the ninth voice data; and a control unit, configured to control the second device to execute a target device operation corresponding to the target voice instruction.

It should be noted herein that the above modules are the same as those in the examples and application scenarios implemented by the corresponding steps, but are not limited to the contents disclosed in the above embodiments. It should be noted that the modules, as a part of the apparatus, may run in the hardware environment as shown in FIG. 1, or may be implemented by software or hardware, where the hardware environment includes network environment.

According to still another aspect of an embodiment of the present disclosure, a storage medium is further provided. Optionally, in the embodiment, the above storage medium may be used to execute program codes of any of the above voice control methods for the device in the embodiments of the present disclosure.

Optionally, in the embodiment, the above storage medium may be located on at least one network device among a plurality of network devices in the network as shown in the above embodiments.

Optionally, in the embodiment, the storage medium is configured to store program codes for executing the following steps:

S1, acquiring a first voice feature of first voice data collected by a cleaning device, where the first voice data are voice data corresponding to a first wake-up instruction sent by a use object, and the first wake-up instruction is used to wake up at least one of the cleaning device and a base station;

S2, acquiring a second voice feature of second voice data collected by the base station, where the second voice data are voice data corresponding to the first wake-up instruction; and S3, selecting a first device to be woken up from the cleaning device and the base station according to the first and second voice features, and waking up the first device, where the first device in a wake-up state is configured to respond to a voice instruction sent by the use object.

Optionally, specific examples in the embodiment may refer to the examples described in the above embodiments, and details are not described again in the embodiment.

Optionally, in the embodiment, the above storage medium may include, but is not limited to, various medium that may store the program codes, such as a USB flash disk, an ROM, an RAM, a removable hard disk, a magnetic disk, or an optical disc, etc.

According to still another aspect of an embodiment of the present disclosure, an electronic apparatus for implementing the above voice control method for the device is further provided, and the electronic apparatus may be a server, a terminal, or a combination thereof.

Figure 7:
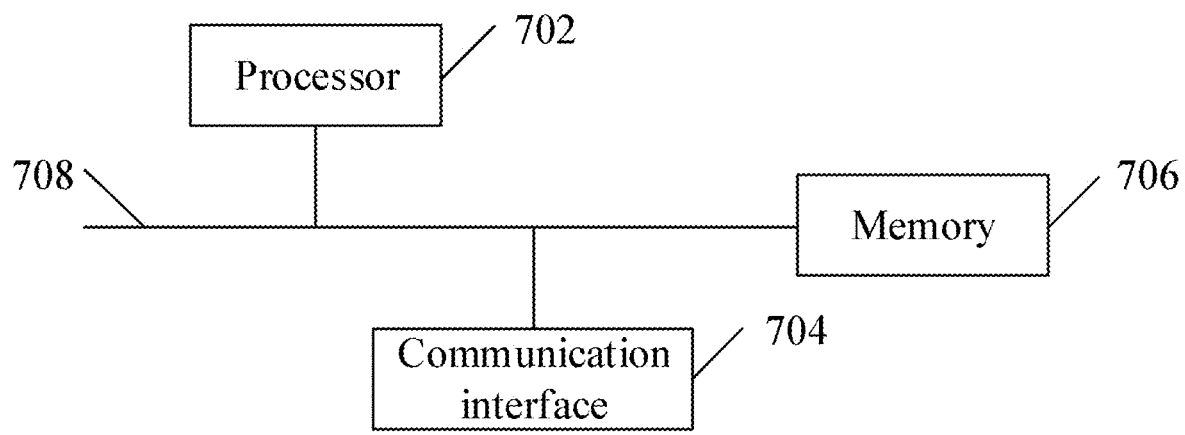
FIG. 7 is a structure diagram of an optional electronic apparatus according to an embodiment of the present disclosure.

FIG. 7 is a structure diagram of an optional electronic apparatus according to an embodiment of the present disclosure. As shown in FIG. 7, the electronic apparatus includes a processor 702, a communication interface 704, a memory 706, and a communication bus 708, where the processor 702, the communication interface 704, and the memory 706 communicate with each other through the communication bus 708, where the memory 706 is configured to store a computer program; and the processor 702 is configured to execute the computer program stored on the memory 706 to implement the following steps:

S1, acquiring a first voice feature of first voice data collected by a cleaning device, where the first voice data are voice data corresponding to a first wake-up instruction sent by a use object, and the first wake-up instruction is used to wake up at least one of the cleaning device and a base station;

S2, acquiring a second voice feature of second voice data collected by the base station, where the second voice data are voice data corresponding to the first wake-up instruction; and S3, selecting a first device to be woken up from the cleaning device and the base station according to the first voice feature and the second voice feature, and waking up the first device, where the first device in a wake-up state is configured to respond to a voice instruction sent by the use object.

Optionally, in the embodiment, the communication bus may be a PCI (Peripheral Component Interconnect) bus, or an EISA (Extended Industry Standard Architecture) bus, etc. The communication bus may be divided into an address bus, a data bus, a control bus, etc. For the ease of representation, only one thick line is used in FIG. 7, but this does not mean that there is only one bus or one type of bus. The communication interface is used for communication between the above electronic apparatus and other devices.

The above memory may include RAM or non-volatile memory, for example, at least one disk memory. Optionally, the memory may also be at least one storage apparatus located far away from the aforementioned processor.

As an example, the above memory 706 may include, but is not limited to, the first acquisition unit 602, the second acquisition unit 604, and the first wake-up unit 606 in the above control apparatus for the device. In addition, it may also include, but is not limited to, other module units in the above control apparatus for the device, and details are not described again in the example.

The above processor may be a general-purpose processor, including but not limited to, a CPU (Central Processing Unit), a NP (Network Processor), etc., and may also be a DSP (Digital Signal Processing), an ASIC (Application Specific Integrated Circuit), an FPGA (Field-Programmable Gate Array), other programmable logic devices, a discrete gate, a transistor logic device, or a discrete hardware component.

Optionally, specific examples in the embodiment may refer to the examples described in the above embodiments, and details are not described again in the embodiment.

A person of ordinary skill in the art may understand that the structure shown in FIG. 7 is only schematic, and the devices for implementing the above voice control methods for the device may be terminal devices, and the terminal devices may be smart phones (such as Android phones and IOS phones, etc.), tablet computers, palmtop computers, Mobile Internet Devices (MID), or PAD, etc. FIG. 7 imposes no limitation on the structure of the above electronic apparatus. For example, the electronic apparatus may further include more or fewer components (such as a network interface and a display apparatus) than those shown in FIG. 7, or have a configuration different from that shown in FIG. 7.

A person of ordinary skill in the art may understand that all or some steps of each method in the above embodiments may be implemented by instructing the hardware related to the terminal device via a program. The program may be stored in a computer-readable storage medium. The storage medium may include: a flash disk, a ROM, a RAM, a magnetic disk, the optical disc, or the like.

The above serial numbers of the embodiments of the present disclosure are only for a descriptive purpose, and do not represent the merits of the embodiments.

If an integrated unit in the above embodiments is implemented in a form of a software functional unit and sold or used as an independent product, it may be stored in the above computer-readable storage medium. Based on such an understanding, the technical solutions of the present disclosure essentially, the part contributing to the prior art, or all or some of the technical solutions may be implemented in a form of a software product. The computer software product is stored in a storage medium, and includes several instructions for instructing one or more computer devices (may be a personal computer, a server or a network device, or the like) to perform all or some steps of the method described in each embodiment of the present disclosure.

In the above embodiments of the present disclosure, the descriptions of each embodiment have their own emphasis. The part that is not described in detail in a certain embodiment may refer to relevant descriptions of other embodiments.

In several embodiments provided in the present disclosure, it should be understood that the disclosed client may be implemented in other manners. The apparatus embodiments described above are merely illustrative. For example, the division of units is merely logical function division and may be other division in actual implementation. For example, a plurality of units or components may be combined or integrated into another system, or some features may be ignored or may not be executed. In addition, the displayed or discussed coupling, direct coupling or communication connection between each other may be implemented through some interfaces. The indirect coupling or communication connection between the units or modules may be in electrical or other forms.

The units described as separate parts may or may not be physically separate, and parts displayed as units may or may not be physical units, namely, they may be located in one position, or may be distributed on a plurality of network units. Some or all units may be selected based on actual needs to achieve the objectives of the solutions provided in the embodiments.

In addition, each functional unit in each embodiment of the present disclosure may be integrated into one processing unit, or each unit may physically exist separately, or two or more units are integrated into one unit. The above integrated unit may be implemented in a form of hardware, or may be implemented in a form of a software functional unit.

The foregoing descriptions are merely preferred implementations of the present disclosure. It should be pointed out that a person of ordinary skill in the art may make several improvements or polishing without departing from the principle of the present disclosure, and these improvements and polishing shall also fall within the protection scope of the present disclosure.

What is claimed is:

1. A voice control method for a device, comprising:
   acquiring a first voice feature of first voice data collected by a cleaning device, wherein the first voice data are voice data corresponding to a first wake-up instruction sent by a use object, and the first wake-up instruction is configured to wake up at least one of the cleaning device and a base station;
   acquiring a second voice feature of second voice data collected by the base station, wherein the second voice data are voice data corresponding to the first wake-up instruction; and
   selecting a first device to be woken up from the cleaning device and the base station according to the first voice feature and the second voice feature, and waking up the first device, wherein the first device in a wake-up state is configured to respond to a voice instruction sent by the use object,
   wherein the first voice feature comprises a first voice intensity of the first voice data, the second voice feature comprises a second voice intensity of the second voice data, and the step of selecting the first device to be woken up from the cleaning device and the base station according to the first voice feature and the second voice feature comprises:
      determining the cleaning device as the first device to be woken up in a case that the first voice intensity is greater than the second voice intensity, and a difference between the first voice intensity and the second voice intensity is greater than or equal to a target intensity threshold;
      determining the base station as the first device to be woken up in a case that the first voice intensity is less than the second voice intensity, and the difference between the first voice intensity and the second voice intensity is greater than or equal to the target intensity threshold; and
      determining a preset device in the cleaning device and the base station as the first device to be woken up in a case that the difference between the first voice intensity and the second voice intensity is less than the target intensity threshold.

2. The method according to claim 1, wherein the step of acquiring the first voice feature of the first voice data collected by the cleaning device comprises:
   performing voice collection through a voice collection part of the cleaning device to obtain the first voice data; and performing voice feature extraction on the first voice data to obtain the first voice feature in a case that the first wake-up instruction is recognized from the first voice data.

3. The method according to claim 1, wherein the step of acquiring the second voice feature of the second voice data collected by the base station comprises:
receiving the second voice data matching the first voice data from the base station; and performing voice feature extraction on the second voice data to obtain the second voice feature; or
receiving the second voice feature matching the first voice feature from the base station, wherein the second voice feature is obtained by performing voice feature extraction on the second voice data.

4. The method according to claim 1, wherein after waking up the first device, the method further comprises:
performing voice collection through a voice collection part of the cleaning device to obtain third voice data;
recognizing a second wake-up instruction from the third voice data, wherein the second wake-up instruction is configured to wake up at least one of the cleaning device and the base station; and
waking up the cleaning device in a case that no voice data matching the third voice data are received from the base station within a first time period, or no voice feature matching a voice feature of the third voice data is received from the base station within the first time period.

5. The method according to claim 1, wherein after waking up the first device, the method further comprises:
receiving fourth voice data from the base station; searching for voice data matching the fourth voice data collected by the cleaning device in a case that a third wake-up instruction is recognized from the fourth voice data, wherein the third wake-up instruction is configured to wake up at least one of the cleaning device and the base station; and sending first indication information to the base station in a case that no voice data matching the fourth voice data collected by the cleaning device are found, wherein the first indication information is configured to indicate determining to wake up the base station; or
receiving a third voice feature from the base station, wherein the third voice feature is obtained by performing voice feature extraction on fifth voice data collected by the base station in a case that a fourth wake-up instruction is recognized from the fifth voice data, and the fourth wake-up instruction is configured to wake up at least one of the cleaning device and the base station; searching for a voice feature matching the third voice feature in voice features of voice data collected by the cleaning device; and sending second indication information to the base station in a case that no voice feature matching the third voice feature is found, wherein the second indication information is configured to indicate determining to wake up the base station.

6. The method according to claim 1, wherein the step of acquiring the second voice feature of the second voice data collected by the base station comprises:
performing voice collection through a voice collection part of the base station to obtain the second voice data; and
performing voice feature extraction on the second voice data to obtain the second voice feature in a case that the first wake-up instruction is recognized from the second voice data.

7. The method according to claim 1, wherein the step of acquiring the first voice feature of the first voice data collected by the cleaning device comprises:
receiving the first voice data matching the second voice data from the cleaning device; and performing voice feature extraction on the first voice data to obtain the first voice feature; or
receiving the first voice feature matching the second voice feature from the cleaning device, wherein the first voice feature is obtained by performing voice feature extraction on the first voice data.

8. The method according to claim 1, wherein after waking up the first device, the method further comprises:
performing voice collection through a voice collection part of the base station to obtain sixth voice data;
recognizing a fifth wake-up instruction from the sixth voice data, wherein the fifth wake-up instruction is configured to wake up at least one of the cleaning device and the base station; and
waking up the base station in a case that no voice data matching the sixth voice data are received from the cleaning device within a second time period, or no voice feature matching a voice feature of the sixth voice data is received from the cleaning device within the second time period.

9. The method according to claim 1, wherein after waking up the first device, the method further comprises:
receiving seventh voice data from the cleaning device; searching for voice data matching the seventh voice data collected by the base station in a case that a sixth wake-up instruction is recognized from the seventh voice data, wherein the sixth wake-up instruction is configured to wake up at least one of the cleaning device and the base station; and sending third indication information to the cleaning device in a case that no voice data matching the seventh voice data collected by the base station are found, wherein the third indication information is configured to indicate determining to wake up the cleaning device; or
receiving a fourth voice feature from the cleaning device, wherein the fourth voice feature is obtained by performing voice feature extraction on eighth voice data collected by the cleaning device in a case that a seventh wake-up instruction is recognized from the eighth voice data, and the seventh wake-up instruction is configured to wake up at least one of the cleaning device and the base station; searching for a voice feature matching the fourth voice feature in voice features of voice data collected by the base station; and sending fourth indication information to the cleaning device in a case that no voice feature matching the fourth voice feature is found, wherein the fourth indication information is configured to indicate determining to wake up the cleaning device.

10. The method according to claim 1, wherein the step of waking up the first device comprises:
sending fifth indication information to the first device, wherein the fifth indication information is configured to indicate determining to wake up the first device.

11. The method according to claim 1, wherein after waking up the first device, the method further comprises:
receiving ninth voice data sent by the first device, wherein the ninth voice data are voice data collected by the first device in the wake-up state;
in a case that a target voice instruction sent by the use object is recognized from the ninth voice data, determining a second device controlled by the target voice instruction in the cleaning device and the base station; and controlling the second device to execute a target device operation corresponding to the target voice instruction.

12. A computer-readable storage medium, wherein the computer-readable storage medium comprises a stored program, wherein when the stored program runs, the method according to claim 1 is executed.

13. An electronic apparatus, comprising a memory and a processor, wherein the memory stores a computer program, and the processor is configured to execute the method according to claim 1 through the computer program.

* * * * *